US009896578B2

(12) United States Patent
Henze et al.

(10) Patent No.: US 9,896,578 B2
(45) Date of Patent: Feb. 20, 2018

(54) THERMOPLASTICALLY PROCESSABLE TRANSPARENT BLENDS OF THERMOPLASTIC POLYURETHANE AND POLY(METH)ACRYLATES

(71) Applicant: BASF SE, Ludwigshafen (DE)

(72) Inventors: Oliver Steffen Henze, Lemfoerde (DE); Frank Uhlhorn, Drebber (DE); Alfons Bertels, Diepholz (DE); Anja Oltmanns, Melle (DE); Marc Hansen, Hannover (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/433,258

(22) PCT Filed: Oct. 14, 2013

(86) PCT No.: PCT/EP2013/071403
§ 371 (c)(1),
(2) Date: Apr. 2, 2015

(87) PCT Pub. No.: WO2014/060342
PCT Pub. Date: Apr. 24, 2014

(65) Prior Publication Data
US 2015/0274958 A1 Oct. 1, 2015

(30) Foreign Application Priority Data
Oct. 16, 2012 (EP) .................................... 12188669

(51) Int. Cl.
| B01D 71/60 | (2006.01) |
| C08L 33/10 | (2006.01) |
| C08G 18/66 | (2006.01) |
| C08G 18/73 | (2006.01) |
| C08L 33/12 | (2006.01) |
| C08L 75/04 | (2006.01) |

(52) U.S. Cl.
CPC ............ *C08L 33/10* (2013.01); *C08G 18/664* (2013.01); *C08G 18/6674* (2013.01); *C08G 18/73* (2013.01); *C08L 33/12* (2013.01); *C08L 75/04* (2013.01); *C08L 2201/10* (2013.01)

(58) Field of Classification Search
CPC ........................................................ C08L 33/10
USPC .......................................................... 525/123
See application file for complete search history.

(56) References Cited

U.S. PATENT DOCUMENTS

| 3,700,752 A | 10/1972 | Hutchinson | |
| 4,500,671 A * | 2/1985 | Goyert ..................... | C08K 7/02 524/494 |
| 4,513,118 A * | 4/1985 | Suetterlin ............. | C08F 285/00 525/304 |
| 5,216,082 A * | 6/1993 | Heil ....................... | C08F 265/06 525/222 |
| 5,539,053 A | 7/1996 | Avenel | |
| 5,650,107 A * | 7/1997 | Vetter ..................... | B29C 47/76 264/102 |
| 2003/0087084 A1* | 5/2003 | Mori ........................ | B32B 5/18 428/318.4 |
| 2005/0107562 A1* | 5/2005 | Leberfinger ....... | C08G 18/0895 528/44 |
| 2009/0105399 A1 | 4/2009 | Schultes et al. | |
| 2011/0015334 A1* | 1/2011 | Numrich ................ | C08L 75/04 524/507 |
| 2011/0244243 A1* | 10/2011 | Uemura .................... | C09J 5/02 428/412 |

FOREIGN PATENT DOCUMENTS

| DE | 38 42 796 | 6/1990 |
| DE | 101 03 424 | 8/2002 |
| EP | 0 052 351 | 5/1982 |
| EP | 0 113 924 | 7/1984 |
| EP | 0 272 975 | 6/1988 |
| EP | 0 465 049 | 1/1992 |
| EP | 0 683 028 | 11/1995 |
| EP | 0 922 552 | 6/1999 |
| WO | 2006 072461 | 7/2006 |
| WO | 2007 057242 | 5/2007 |
| WO | 2009 135702 | 11/2009 |
| WO | 2010 099958 | 9/2010 |

OTHER PUBLICATIONS

International Search Report dated Jan. 22, 2014 in PCT/EP13/071403 filed Oct. 14, 2013.
ISO 1133, Determination of the Melt-Flow Rate (MFR) and the Melt Volume-Flow Rate (MVR) of Thermoplastics, 4$^{th}$ Ed., 2005.
XP009179395, Standard Test Method for Haze and Luminous Transmittance of Transparent Plastics.

* cited by examiner

Primary Examiner — Mike M Dollinger
(74) Attorney, Agent, or Firm — Oblon, McClelland, Maier & Neustadt, L.L.P.

(57) ABSTRACT

The present invention relates to compositions comprising at least one thermoplastic polyurethane and at least one poly (meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol. The present invention further relates to moldings comprising the compositions of the invention, and also to the use of the compositions of the invention for producing a foil and for coating a molding.

17 Claims, No Drawings

THERMOPLASTICALLY PROCESSABLE TRANSPARENT BLENDS OF THERMOPLASTIC POLYURETHANE AND POLY(METH)ACRYLATES

The present invention relates to compositions comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol. The present invention further relates to moldings comprising the compositions of the invention, and also to the use of the compositions of the invention for producing a foil and for coating a molding.

Poly(meth)acrylates, in particular polymethyl methacrylates (PMMA), are plastics with an excellent property profile. However, a disadvantage of these plastics is their low notched impact resistance. In order to improve this property, polymethyl methacrylates are provided with impact modifiers, which are likewise known per se. These impact-modified polymethyl methacrylates are disclosed inter alia in EP 0 113 924 A, EP 0 522 351 A, EP 0 465 049 A, and EP 0 683 028 A. However, many of these compositions exhibit a marked tendency toward what is known as stress whitening. Stress whitening is haze which occurs in the plastic when it is subject to flexural stress or to impact. DE 38 42 796 describes an impact-resistant plastics molding composition based on methyl(meth)acrylate with little stress whitening.

There are moreover known plastics mixtures which comprise poly(meth)acrylates and polyurethanes. This mixture also gives a plastic with good notched impact resistance. Interpenetrating networks based on mixtures of poly(meth) acrylates and of polyurethanes are described inter alia in U.S. Pat. No. 3,700,752, U.S. Pat. No. 5,539,053, and EP 0 272 975 A. A disadvantage is that these plastics often cannot be processed thermoplastically.

WO 2007/057242 A1 describes transparent low-temperature-impact-resistant plastics mixtures made of a thermoplastic polyurethane (TPU) and of an impact-modified poly (meth)acrylate. According to WO 2007/057242 A1, these plastics mixtures exhibit not only good impact resistance, a high tensile modulus, and good weathering resistance, but also acceptable transparency. The plastics mixtures use thermoplastic polyurethanes having aliphatic linkages. WO 2007/057242 A1 teaches that, under the test conditions stated in that document, transmittance values of 83% can be achieved for mixtures of impact-modified poly(meth)acrylates and of thermoplastic polyurethanes having aliphatic linkages.

WO 2009/135702 A1 describes plastics mixtures which are made of thermoplastic polyurethanes and of impact-modified poly(meth)acrylate and which, according to WO 2009/135702 A1, exhibit particularly little cracking, little tendency toward stress whitening, high notched impact resistance values at low temperatures, good UV resistance, high transparency, and also good printability. This is achieved via use of an impact-modified poly(meth)acrylate having a hard phase with a glass transition temperature of at least 70° C. and a tough phase with a glass transition temperature of at most −10° C., where the tough phase has an average particle size of at most 130 nm, and at least a portion of the tough phase has covalent linkage to the hard phase. The plastics mixture preferably uses thermoplastic polyurethanes which have at most 10% by weight of aromatic groups.

However, transparency alone has been found not to be a sufficient criterion for assessing the plastics, since transparency is influenced not only by the permeability to light or transmittance but also by HAZE and clarity.

The HAZE value is a measure of the HAZE of transparent specimens, e.g. plastics sheets or plastics foils. The HAZE value describes the proportion of the transmitted light that is scattered in a forward direction when light passes through the specimen (scattering >2.5°). The HAZE value therefore quantifies defects in the material which are present at the surface or within the structure and which impair transparency. Although the plastics mixtures disclosed in the prior art exhibit high transmittance, the HAZE values of these plastics mixtures are inadequate for many applications.

Another criterion for assessing the optical properties of plastics is clarity, which likewise is a concomitant factor in the assessment of transparency. In contrast to the measurement of the HAZE value, the clarity value is recorded via determination of scattering within a very small angular range (scattering <2.5°). By virtue of this scattering, shapes become distorted and appear less sharp. The plastics mixtures disclosed in the prior art frequently have inadequate clarity.

Starting from this prior art, it was an object of the present invention to provide compositions made of thermoplastic polyurethanes and of poly(meth)acrylates which are suitable for producing foils and coatings, i.e. which exhibit high transmittance and at the same time exhibit low haze, in particular low haze and high clarity.

This composition should be very easy to produce, and should be capable of thermoplastic processing.

Another object of the present invention can moreover be considered to be that of providing moldings, in particular foils, with high transmittance, high gloss, and low haze.

The invention achieves said object via a composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.

Surprisingly, it has been found that these compositions exhibit very good HAZE values, which are a measure of HAZE, and per se have good property profiles for producing foils.

For the purposes of the present invention, unless otherwise stated, HAZE values for a composition are measured in accordance with ASTM D1003, Procedure A, on an injection-molded plaque of thickness 2 mm produced from the composition.

Surprisingly, it has been found that the HAZE value of the compositions can be influenced via the inventive selection of the thermoplastic polyurethane used. It has been found that compositions comprising thermoplastic polyurethanes based on other isocyanates exhibit poorer HAZE values, i.e. more haze.

The compositions of the invention, and moldings produced therefrom, also exhibit surprisingly good, i.e. high, clarity values. Clarity is likewise determined on injection-molded plaques of thickness 2 mm in accordance with ASTM D1003.

It has moreover been found that the compositions of the invention are easy to produce. Thermoplastic polyurethanes based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol can be processed with poly(meth)acrylates in a surprisingly successful manner.

If the compositions used thermoplastic polyurethanes based on other isocyanates and on other chain extenders not of the invention, resultant properties are unsuitable for processing together with poly(meth)acrylates: by way of example, decomposition can occur during processing, or the individual components lack miscibility.

The compositions of the invention can in particular be processed to give moldings which exhibit particularly little crack propagation and little tendency toward stress whitening. Furthermore, moldings comprising a composition of the invention exhibit excellent mechanical properties, for example high tensile modulus, high tensile strain at break, and high notched impact resistance. Surprisingly, said properties are also retained at low temperatures.

The composition of the invention can be processed thermoplastically, and exhibits high weathering resistance, in particular high UV resistance. In one preferred embodiment, a composition of the invention can be processed to give foils or other moldings which exhibit high transparency, low haze, and preferably high gloss.

The compositions of the invention comprise at least one thermoplastic polyurethane and at least one poly(meth)acrylate.

Thermoplastic polyurethanes are in principle known from the prior art. The compositions of the invention use at least one thermoplastic polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.

Thermoplastic polyurethanes are usually produced via reaction of the following components: (a) isocyanates and (b) compounds reactive toward isocyanates, and optionally (c) chain extenders optionally in the presence of at least one (d) catalyst, and/or (e) conventional auxiliaries and/or of additives. The following components: (a) isocyanate, (b) compounds reactive toward isocyanates, and (c) chain extenders are also individually or jointly termed structural components.

The invention uses hexamethylene 1,6-diisocyanate (HDI) as organic isocyanate (a). It is possible here for the purposes of the invention to use pure HDI. It is equally possible to use HDI with up to 5% by weight of contaminants or additives.

The compositions of the invention comprising at least one thermoplastic polyurethane based on HDI are found to have particularly advantageous property profiles.

The invention uses at least one diol as compound (b) reactive toward isocyanates.

For the purposes of the present invention it is possible here to use any of the suitable diols, for example polyether diols or polyester diols, or a mixture of two or more thereof.

Suitable polyether diols according to the present invention are for example polyether diols based on ethylene oxide or propylene oxide or mixtures thereof, for example copolymers such as blockcopolymers. The ratio of ethylene oxide units to propylene oxide units can vary in wide ranges, the ratio of ethylene oxide units to propylene oxide units can for example be in the range of from 50:50 to 95:5, preferably in the range of from 60:40 to 90:10, more preferred in the range of from 70:30 to 85:15, in particular preferred in the range of from 75:25 to 80:20. The molecular weight of the polyether diols used in the present invention is for example in the range of from 1000 to 4000 Dalton, preferably in the range of from 1500 to 3000 Dalton, more preferred in the range of from 2000 to 2500 Dalton.

Particular diols used in the invention are polyester diols. It has been found that compositions with particularly advantageous property profiles are obtained by using thermoplastic polyurethanes based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol. By way of example, the foils are particularly suitable for producing foils with high transmittance and low haze.

Accordingly, one preferred embodiment of the present invention provides a composition comprising at least one thermoplastic polyurethane and at least one poly(meth)acrylate as described above, where the diol is a polyester diol.

In principle, the invention can use any suitable polyester diols, and for the purposes of the present invention the expression polyester diol also comprises polycarbonate diols.

For the purposes of the present invention it is particularly preferable that at least 90% to 100% of the diol is a polyester diol, more preferably at least 95% to 100%, in particular at least 98% to 100%. The proportions of polyethers in the diol are in particular preferably smaller than 5%, more preferably smaller than 2%, with particular preference smaller than 1%.

Suitable polyester diols can by way of example be produced from organic dicarboxylic acids having from 2 to 12 carbon atoms, preferably aromatic dicarboxylic acids having from 8 to 12 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebaic acid, decanedicarboxylic acid, maleic acid, fumaric acid, and phthalic acid, isophthalic acid, terephthalic acid, and the isomeric naphthalenedicarboxylic acids. The dicarboxylic acids can be used either individually or else in a mixture with one another. Instead of the free dicarboxylic acids it is also possible to use the corresponding dicarboxylic acid derivatives, for example dicarboxylic esters of alcohols having from 1 to 4 carbon atoms, or dicarboxylic anhydrides. Examples of di- and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylolpropane, preferably ethylene glycol, 1,3-propanediol, methyl-1,3-propanediol, 1,4-butanediol, 3-methyl-1,5-pentanediol, or 1,6-hexanediol. Examples of other compounds suitable in the invention are polyester diols made of lactones, such as ε-caprolactone, or hydroxycarboxylic acids, e.g. ω-hydroxycaproic acid and hydroxybenzoic acids.

The reaction conditions for carboxylic acid and alcohol are usually selected in such a way that the resultant polyesterols have no free acid groups. The actual functionality of the resultant polyesterols is usually from 1.9 to 2.1, preferably 2.0.

To produce the polyesterols, the mixtures of acids and alcohols can be polycondensed without catalyst or preferably in the presence of esterification catalysts, advantageously in an atmosphere of inert gases, e.g. nitrogen, carbon monoxide, helium, or argon. The polycondensation can take place at temperatures of from 150 to 250° C., preferably from 180 to 220° C., optionally under reduced pressure. The polycondensation is usually continued until a desired acid number has been reached which is advantageously smaller than 10, preferably smaller than 2. The molar ratio in which acids and alcohols are polycondensed to produce the polyesterols is usually from 1:1 to 1.8, preferably from 1:1.05 to 1.2.

In particular, for the purposes of the present invention it is preferable to use polyester diols made of ε-caprolactone, and to use, as polyester diols, condensates of adipic acid or sebacic acid with at least one alcohol selected from the group consisting of ethylene glycol, 1,3-propanediol, methyl-1,3-propanediol, 1,4-butanediol, 3-methyl-1,5-pentanediol, or 1,6-hexanediol.

The number-average molecular weights Mn of the polyester diols used is preferably in the range from 500 to 4000, determined by way of GPC, with preference in the range from 650 to 3500, determined by way of GPC, with particular preference in the range from 800 to 3000, determined by way of GPC. The person skilled in the art is aware of suitable conditions for determining molecular weight by means of GPC.

Chain extender (c) used in the invention comprises at least one chain extender selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol. Chain extenders selected from the group consisting of ethylene 1,2-glycol, 1,3-propanediol, 1,4-butanediol, and 1,6-hexanediol are particularly suitable.

In one preferred embodiment, the present invention provides a composition comprising at least one thermoplastic polyurethane and at least one poly(meth)acrylate as described above, where the at least one chain extender is one selected from the group consisting of ethylene 1,2-glycol, 1,3-propanediol, 1,4-butanediol, and 1,6-hexanediol.

In one preferred embodiment, catalysts (d) which in particular accelerate the reaction between the NCO groups of the diisocyanates (a) and the hydroxy groups of the compound (b) reactive toward isocyanates and the chain extender (c) are tertiary amines, in particular triethylamine, dimethylcyclohexylamine, N-methylmorpholine, N,N'-dimethylpiperazine, 2-(dimethyl-aminoethoxy)ethanol, or diazabicyclo[2.2.2]octane, and in another preferred embodiment these are organometallic compounds, such as titanic esters, iron compounds, preferably iron(III) acetylacetonate, tin compounds, preferably tin diacetate, tin dioctoate, tin dilaurate, or the dialkyltin salts of aliphatic carboxylic acids, preferably dibutyltin diacetate, dibutyltin dilaurate, or bismuth salts in which bismuth is preferably present in the oxidation state 2 or 3, in particular 3. Preference is given to salts of carboxylic acids. Carboxylic acids used are preferably carboxylic acids having from 6 to 14 carbon atoms, particularly preferably having from 8 to 12 carbon atoms.

Examples of suitable bismuth salts are bismuth(III) neodecanoate, bismuth 2-ethylhexanoate, and bismuth octanoate.

Preferred amounts used of the catalysts (d) are from 0.0001 to 0.1 part by weight per 100 parts by weight of the compound (b) reactive toward isocyanates. It is preferable to use tin catalysts, in particular tin dioctoate.

Materials that can be added to the structural components (a) to (c) are not only catalysts (d) but also conventional auxiliaries (e). Mention may be made by way of example of surfactant substances, fillers, further flame retardants, nucleating agents, oxidation stabilizers, lubricants and mold-release aids, dyes, and pigments, and optionally stabilizers, e.g. for protection from hydrolysis, light, heat, or discoloration, inorganic and/or organic fillers, reinforcing agents, and plasticizers. Suitable auxiliaries and additives can be found by way of example in Kunststoffhandbuch [Plastics handbook], volume VII, edited by Vieweg and Hochtlen, Carl Hanser Verlag, Munich 1966 (pp. 103-113).

Suitable production processes for thermoplastic polyurethanes are disclosed by way of example in EP 0922552 A1, DE 10103424 A1, or WO 2006/072461 A1. The production process usually takes place in a belt system or a reactive extruder, but can also take place on a laboratory scale, for example by the manual casting process. As a function of the physical properties of the components, these are all directly mixed with one another or individual components are premixed and/or prereacted, e.g. to give prepolymers, and only then subjected to the polyaddition reaction. In another embodiment, a thermoplastic polyurethane is first produced from the structural components, optionally with catalyst, and auxiliaries can then optionally have been incorporated into the polyurethane. In order to adjust the hardness of the TPUs, the amounts used of the structural components (b) and (c) can be varied within a relatively wide range of molar ratios, and hardness here usually rises as content of chain extender (c) increases.

To produce thermoplastic polyurethanes such as those with a Shore A hardness of less than 95, preferably from 95 to 75 Shore A, particularly preferably about 85 A, by way of example, the polyhydroxy compounds (b) that are in essence difunctional, and chain extenders (c) can be used advantageously in molar ratios of from 1:1 to 1:5, preferably from 1:1.5 to 1:4.5, so that the resultant mixtures of the structural components (b) and (c) have a hydroxy equivalent weight of more than 200, and in particular from 230 to 450, while to produce harder TPUs, e.g. those with Shore A hardness of more than 98, preferably from 55 to 75 Shore D, the (b):(c) molar ratios are in the range from 1:5.5 to 1:15, preferably from 1:6 to 1:12, so that the hydroxy equivalent weight of the resultant mixtures of (b) and (c) is from 110 to 200, preferably from 120 to 180.

To produce the thermoplastic polyurethanes of the invention, the structural components (a), (b), and (c) are preferably reacted in the presence of catalysts (d) and optionally of auxiliaries and/or additives (e) in amounts such that the equivalence ratio of NCO groups of the diisocyanates (a) to the entirety of the hydroxy groups of the structural components (b) and (c) is from 0.9 to 1.1:1, preferably from 0.95 to 1.05:1, and in particular approximately 0.96 to 1.0:1.

The Shore hardness (Shore A) of the thermoplastic polyurethane comprised in the compositions in the invention is in the range from 70 to 100. The Shore hardness (Shore A) of the thermoplastic polyurethane is preferably in the range from 80 to 95, more preferably in the range from 85 to 90.

One preferred embodiment of the present invention accordingly provides a composition comprising at least one thermoplastic polyurethane and at least one poly(meth)

acrylate as described above, where the Shore hardness (Shore A) of the thermoplastic polyurethane is in the range from 70 to 100.

Shore hardness here is determined in accordance with DIN 53505.

It is moreover preferable that the thermoplastic polyurethane comprised in the compositions has a melt volume flow rate (MVR) in the range from 5 to 200 g/10 min, measured in accordance with DIN EN ISO 1133, where unless otherwise stated measurements are made at a specimen temperature of 200° C. and with 5 kg load. The melt volume flow rate is a measure of the molecular weight of the thermoplastic polyurethane.

One preferred embodiment of the present invention accordingly provides a composition comprising at least one thermoplastic polyurethane and at least one poly(meth)acrylate as described above, where the at least one thermoplastic polyurethane has a melt volume flow rate (MVR) in the range from 5 to 200 g/10 min, measured in accordance with DIN EN ISO 1133.

The composition of the invention comprises an amount in the range from 5% by weight to 60% by weight, based on the entire composition, of the at least one thermoplastic polyurethane, preferably an amount in the range from 10% by weight to 50% by weight, more preferably an amount in the range from 15% by weight to 45% by weight, and particularly preferably in an amount in the range from 25% by weight to 40% by weight, based in each case on the entire composition.

The composition in the invention comprises at least one poly(meth)acrylate. For the purposes of the present invention, the expression poly(meth)acrylate means a polymer obtainable via free-radical polymerization of (meth)acrylates. Preferred poly(meth)acrylates are impact-modified poly(meth)acrylates. It is also possible in the invention that the composition comprises a mixture of various poly(meth)acrylates, in particular a mixture of a poly(meth)acrylate and of an impact-modified poly(meth)acrylate.

For the purposes of the present invention, the expression impact-modified means that the properties of the poly(meth)acrylate have been altered via addition of an impact modifier in such a way as to give improved properties in a non-instrumented impact resistance test in accordance with ISO 179-1:2010.

In particular, poly(meth)acrylates suitable in the invention are those comprising at least 40% by weight, particularly preferably at least 60% by weight, and very particularly preferably at least 80% by weight, of repeating units that derive from (meth)acrylates. The poly(meth)acrylates can preferably be obtained via free-radical polymerization. Accordingly, the proportion by weight of repeating units results from the proportions by weight used of corresponding monomers for producing the polymers.

The expression (meth)acrylates comprises methacrylates and acrylates, and also mixtures of the two. These monomers are well known. Among them are inter alia (meth)acrylates which derive from saturated alcohols, for example methyl (meth)acrylate, ethyl(meth)acrylate, propyl(meth)acrylate, n-butyl(meth)acrylate, tert-butyl(meth)acrylate, pentyl(meth)acrylate, and 2-ethylhexyl(meth)acrylate; (meth)acrylates which derive from unsaturated alcohols, e.g. oleyl (meth)acrylate, 2-propynyl(meth)acrylate, allyl(meth)acrylate, vinyl(meth)acrylate; aryl(meth)acrylate, such as benzyl(meth)acrylate or phenyl(meth)acrylate, where each of the aryl moieties can be unsubstituted or can have up to four substituents; cycloalkyl(meth)acrylates, such as 3-vinylcyclohexyl(meth)acrylate, bornyl(meth)acrylate; hydroxylalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate; glycol di(meth)acrylates, such as 1,4-butanediol(meth)acrylate, (meth)acrylates of ether alcohols, for example tetrahydrofurfuryl(meth)acrylate, vinyloxyethoxyethyl(meth)acrylate; amides and nitriles of (meth)acrylic acid, for example N-(3-dimethylaminopropyl)(meth)acrylamide, N-(diethylphosphono)(meth)acrylamide, 1-methacryloylamido-2-methyl-2-propanol; sulfur-containing (meth)acrylates, such as ethylsulfinylethyl(meth)acrylate, 4-thiocyanatobutyl (meth)acrylate, ethylsulfonylethyl(meth)acrylate, thiocyanatomethyl(meth)acrylate, methylsulfinylmethyl(meth)acrylate, bis((meth)acryloyloxyethyl)sulfide; polyfunctional (meth)acrylates, such as trimethyloylpropane tri(meth)acrylate.

A poly(meth)acrylate used in the invention can comprise, alongside the (meth)acrylates, repeating units that derive from comonomers.

Among these are inter alia 1-alkenes, such as 1-hexene and 1-heptene; branched alkenes, such as vinylcyclohexane, 3,3-dimethyl-1-propene, 3-methyldiisobutylene, 4-methyl-1-pentene; acrylonitrile; vinyl esters, such as vinyl acetate; styrene, and substituted styrenes having an alkyl substituent in the side chain, e.g. alpha-methylstyrene and alpha-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes, and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazol, 3-vinylcarbazol, 4-vinylcarbazol, 1-vinylimidazol, 2-methyl-1-vinylimidazol, N-vinylpyrrolidone, 2-vinylpyrrolidone, N-vinylpyrrolidine, 3-vinylpyrrolidine, N-vinylcaprolactam, N-vinylbutyrolactam, vinyloxolan, vinylfuran, vinylthiophene, vinylthiolane, vinylthiazole, and hydrogenated vinylthiazoles, vinyloxazoles, and hydrogenated vinyloxazoles; vinyl and isoprenyl ethers; maleic acid derivatives, such as maleic anhydride, methylmaleic anhydride, maleimide, and methylmaleimide; and dienes, such as divinylbenzene.

The amount of these comonomers used for producing the poly(meth)acrylates is generally from 0 to 60% by weight, preferably from 0.1 to 40% by weight, and particularly preferably from 1 to 20% by weight, based on the weight of the monomers, and the compounds here can be used individually or in the form of a mixture.

It is very particularly preferable to use polymethyl methacrylate (PMMA) as poly(meth)acrylate. These polymers comprise a high proportion of repeating units which derive from methyl methacrylate. Mixtures for producing polymethyl methacrylate generally comprise at least 50% by weight and at most 100% by weight, preferably at least 80% by weight, and particularly preferably at least 95% by weight, based on the weight of the monomers, of methyl methacrylate.

Another embodiment of the present invention therefore also provides a composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.

The weight-average molar mass Mw of preferred poly(meth)acrylates, in particular of preferred polymethyl methacrylates, is in the range from 20 000 to 1 000 000 g/mol, preferably from 50 000 to 500 000 g/mol, and particularly preferably from 80 000 to 300 000 g/mol, determined by means of GPC.

For the purposes of the present invention it is in principle possible to use any suitable poly(meth)acrylates, and it is preferable here to use mixtures of two or more poly(meth)acrylates, particularly mixtures of two or more poly(meth)acrylates comprising impact-modified poly(meth)acrylates.

In one particular aspect of the present invention, the ratio by weight of impact-modified poly(meth)acrylate to other poly(meth)acrylate can be in the range from 1:10 to 10:1.

The ratio by weight of the at least one thermoplastic polyurethane to the at least one poly(meth)acrylate in the invention can be in the range from 1:10 to 1:1.

One preferred embodiment of the present invention accordingly provides a composition comprising at least one thermoplastic polyurethane and at least one poly(meth)acrylate as described above, where the ratio by weight of the at least one thermoplastic polyurethane to the at least one poly(meth)acrylate is in the range from 1:5 to 1:1, particularly preferably in the range from 1:4 to 1:1.5, more preferably in the range from 1:3 to 1:2.

Another preferred embodiment of the present invention moreover provides a composition comprising at least one thermoplastic polyurethane and at least one poly(meth)acrylate as described above, where the at least one poly(meth)acrylate is an impact-modified poly(meth)acrylate.

For the purposes of the present invention it is possible in principle to use any of the suitable impact-modified poly(meth)acrylates, and it is preferable here to use an impact modifier based on crosslinked poly(meth)acrylates.

An impact-modified poly(meth)acrylate particularly preferred in the invention comprises a hard phase with a glass transition temperature of at least 70° C. and a tough phase with a glass transition temperature of at most −10° C., where the tough phase has an average particle size of at most 130 nm, and at least a portion of the tough phase has covalent linkage to the hard phase. Accordingly, the tough phase is present in particulate form in the plastics mixture, and the continuous phase which surrounds these particles can comprise inter alia the hard phase, and further poly(meth)acrylate, and/or thermoplastic polyurethane. The diameter of the particles here is smaller than or equal to 130 nm, and preferred plastics mixtures here comprise a tough phase with a particle size smaller than or equal to 70 nm, where the particle size is based on the diameter of the ponderal average. The uniformity index of the tough phase comprised in the plastics mixture is preferably 0.5 or lower. Particular preference is given to uniformity index smaller than or equal to 0.2. High uniformity index of the tough phase particles leads inter alia to particularly transparent plastics.

It is preferable that the tough phase of the poly(meth)acrylate particularly preferred in the invention has a glass transition temperature of at most −10° C. It is preferable that the glass transition temperature of the tough phase is below or equal to −20° C.

The glass transition temperature can be influenced by way of the nature, and the proportion, of the monomers used for producing the tough phase. The glass transition temperature Tg of the polymer here can be determined in a known manner by means of Differential Scanning calorimetry (DSC).

By way of example, the tough phase of a particularly preferred poly(meth)acrylate can comprise at least 50% by weight, preferably at least 60% by weight, of repeating units which derive from an alkyl acrylate having from 1 to 6 carbon atoms, based on the weight of the tough phase of the poly(meth)acrylate. Among these monomers to be used with preference are in particular methyl acrylate, ethyl acrylate, propyl acrylate, n-butyl acrylate, tert-butyl acrylate, pentyl acrylate, and hexyl acrylate, particular preference being given here to butyl acrylate.

It is preferable in the invention that at least a portion of the tough phase has covalent linkage to the hard phase. It is advantageous that at least 5% by weight, preferably at least 15% by weight, and particularly preferably at least 20% by weight, of the hard phase has covalent linkage to the tough phase. Covalent linkage of the tough phase to the hard phase can in particular be achieved via the use of crosslinking monomers during the production of the tough phase of the impact-modified poly(meth)acrylates. Crosslinking monomers are compounds which have two, three or more groups capable of free-radical polymerization.

Among these are in particular (meth)acrylates having two double bonds, for example (meth)acrylates which derive from unsaturated alcohols, e.g. 2-propynyl(meth)acrylate, allyl(meth)acrylate, vinyl(meth)acrylate, and also (meth)acrylates which derive from diols or from higher-functionality alcohols, e.g. glycol di(meth)acrylates such as ethylene glycol di(meth)acrylate, diethylene glycol di(meth)acrylate, triethylene glycol di(meth)acrylate, tetra- and polyethylene glycol di(meth)acrylate, 1,3-butanediol(meth)acrylate, 1,4-butanediol(meth)acrylate, 1,6-hexanediol di(meth)acrylate, glycerol di(meth)acrylate, and diurethane dimethacrylate; (meth)acrylates having three or more double bonds, e.g. glycerol tri(meth)acrylate, trimethylolpropane tri(meth)acrylate, pentaerythritol tetra(meth)acrylate, and dipentaerythritol penta(meth)acrylate. A distinction is often drawn between what are known as crosslinking agents and graft-linking agents. The group of the crosslinking agents comprises monomers which comprise at least two acrylic or methacrylic moieties. The term graft-linking agents is used for monomers which comprise not only an acrylic or methacrylic moiety but also an ethylenically unsaturated group having markedly less tendency toward polymerization, generally an allyl group.

It is preferable that the tough phase comprises at least 0.5% by weight, preferably at least 1% by weight, based on the weight of the tough phase, of repeating units which derive from crosslinking monomers. Preference is given here to graft-linking agents or to monomers which comprise three or more acrylic or methacrylic groups within the molecule. The proportion of repeating units which derive from graft-linking agents or from monomers which comprise three or more acrylic or methacrylic groups within the molecule is particularly preferably in the range from 1 to 4% by weight, based on the weight of the tough phase. The material can advantageously comprise a proportion of from 0.05 to 2% by weight of monomers which comprise, in the form of repeating units in the tough phase, two (meth)acrylic groups within the molecule.

Since the repeating units by way of which the tough phase is linked covalently to the hard phase are derived from monomers used during the production of the tough phase, the weight of these repeating units is allocated to the tough phase. Preferred tough phases can comprise not only the repeating units described above which derive from alkyl acrylate having from 1 to 6 carbon atoms or from crosslinking monomers but can also comprise repeating units which derive from other monomers. Among these monomers are in particular the (meth)acrylates described above which differ from the alkyl acrylates having from 1 to 6 carbon atoms and, from the crosslinking monomers. The impact-modified poly(meth)acrylate comprises, alongside the tough phase, at least one hard phase covalently bonded to the tough phase. The hard phase has a glass transition temperature of at least 70° C., preferably at least 80° C. As described above, the glass transition temperature can be adjusted via the selection of the monomers for producing the hard phase.

It is preferable that the hard phase of a preferred impact-modified poly(meth)acrylate comprises at least 80% by weight, particularly at least 90% by weight, of repeating units which derive from methyl methacrylate, based on the weight of the hard phase of the poly(meth)acrylate. The hard phase of preferred poly(meth)acrylates can comprise, alongside methyl methacrylate, up to 20% by weight of comonomers.

In one preferred embodiment, the ratio by weight between the hard phase covalently bonded to the tough phase and the tough phase of the impact-modified poly(meth)acrylate can be at least 1:10, particularly at least 1:5, and very particularly at least 1:1.

By way of example, the poly(meth)acrylate, in particular the impact-modified poly(meth)acrylate, comprises at most 0.1% by weight, particularly preferably at most 0.05% by weight, of water-soluble constituents, based on the weight of the poly(meth)acrylate. A minimized proportion of water-soluble constituents can in particular be achieved via the work-up process during production of the poly(meth)acrylate. By virtue of this measure it is in particular possible to reduce susceptibility to haze on exposure to moisture.

Particularly suitable poly(meth)acrylates comprise a minimized proportion of aromatic groups, in particular of styrene. Particularly advantageous impact-modified poly (meth)acrylates are those which comprise at most 10% by weight, particularly preferably at most 2% by weight, and very particularly preferably at most 0.5% by weight, of repeating units which derive from monomers having aromatic groups, in particular from styrene monomers.

It is preferable that the composition of the invention comprises an amount of from 40 to 95% by weight of the at least one poly(meth)acrylate, in particular from 50 to 90% by weight, particularly from 60 to 85% by weight, for example from 70 to 80% by weight.

One preferred embodiment of the present invention accordingly provides a composition comprising at least one thermoplastic polyurethane and at least one poly(meth) acrylate as described above, where the composition comprises from 5 to 60% by weight of the at least one thermoplastic polyurethane, and from 40 to 95% by weight of the at least one poly(meth)acrylate.

Poly(meth)acrylates suitable in the invention can be obtained inter alia via known emulsion polymerization processes which are described inter alia in Ullmann's Encyclopedia of Industrial Chemistry, Fifth Edition. This is generally achieved by producing an aqueous phase which can comprise not only water but conventional additives, in particular emulsifiers and protective colloids, for stabilizing the emulsion.

Suitable production processes are described in WO 2009/135702 A1, or in DE 38 42 796 A.

To produce the compositions of the invention, the at least one thermoplastic polyurethane can be compounded with the at least one poly(meth)acrylate in a manner known per se, for example in an extruder. The reaction conditions here can vary widely. The compounding for the purposes of the present invention preferably takes place at a temperature in the range from 200 to 260° C.

Accordingly, the present invention also provides a process for producing a composition comprising at least one thermoplastic polyurethane and at least one poly(meth)acrylate as described above, where the at least one thermoplastic polyurethane is compounded with the at least one poly (meth)acrylate at a temperature in the range from 200 to 260° C.

The ratio by weight of the at least one thermoplastic polyurethane to the entirety of the poly(meth)acrylates used can preferably be in the range from 1:5 to 1:1, particularly preferably from 1:4 to 1:1.5.

The composition of the invention can comprise other compounds, alongside the at least one thermoplastic polyurethane and the at least one poly(meth)acrylate. The composition can by way of example comprise from 0 to 30% by weight, in particular from 0.01 to 30% by weight, of other compounds.

Unless otherwise stated, the entirety of all components of the composition of the invention gives 100% by weight.

The composition of the invention can by way of example comprise other polymers alongside a thermoplastic polyurethane and a poly(meth)acrylate. Among these are in particular polystyrenes, polymers which comprise acrylonitrile or maleic anhydride, polyacrylonitriles, polyethers, polyesters, polycarbonates, and also polyvinyl chlorides, particular preference being given here to poly(meth)acrylates.

The weight-average molar mass Mw of the homo- and/or copolymers which optionally can be comprised, alongside the at least one thermoplastic polyurethane and the at least one poly(meth)acrylate in the composition of the invention can vary widely, and the molar mass here is usually adjusted in accordance with the intended application and the mode of processing of the composition. However, it is generally in the range from 20 000 to 1 000 000 g/mol, preferably from 50 000 to 500 000 g/mol, and particularly preferably from 80 000 to 300 000 g/mol, determined by means of GPC.

The compositions of the invention can comprise conventional additives. Among these are by way of examples dyes, pigments, fillers, reinforcement fibers, and lubricants. It is also possible to use polymerizable UV absorbers in order to alter the properties of the composition of the invention. These can by way of example be copolymerized together with the other monomers during the polymerization of the hard-phase monomers into the emulsion polymer. Another possibility is moreover that these compounds are also used during the production of the poly(meth)acrylate.

In particular, compositions which comprise at least one UV absorber exhibit surprising advantages.

Preference is given in the invention to compositions where an injection-molded plaque of thickness 2 mm produced from the composition has a HAZE value smaller than 25, measured in accordance with ASTM D1003, Procedure A, using test specimens measuring 2 mm. Particular preference is given to a HAZE value smaller than 20, in particular smaller than 15.

One preferred embodiment of the present invention accordingly provides a composition comprising at least one thermoplastic polyurethane and at least one poly(meth) acrylate as described above, where an injection-molded plaque of thickness 2 mm produced from the composition has a HAZE value smaller than 25, measured in accordance with ASTM D1003, Procedure A, using test specimens measuring 2 mm.

The compositions of the invention can be processed to give moldings, for example foils with high transmittance.

The transmittance of the compositions of the invention and, respectively, of the moldings that can be obtained therefrom, is preferably at least 60%, with preference at least 70%, and with very particular preference at least 80%, and with greater preference at least 85%, in particular at least 90%. Transmittance is measured in accordance with ASTM D1003 for the purposes of the present invention.

Accordingly, the present invention also provides moldings comprising a composition of the invention comprising at least one thermoplastic polyurethane and at least one poly(meth)acrylate as described above, or moldings comprising a composition obtainable by a process of the invention.

One preferred embodiment of the present invention also provides moldings comprising a composition of the invention comprising at least one thermoplastic polyurethane and at least one poly(meth)acrylate as described above, or comprising a composition obtainable by a process of the invention, where the molding is a foil.

The moldings of the invention, in particular foils, exhibit particularly little tendency toward cracking, and high resistance to crack propagation.

The compositions of the invention can be used for producing moldings with excellent properties. Preferred moldings are in particular foils. Foils of this type feature long-lasting clarity, resistance to high and low temperature, weathering resistance, and little yellowing and embrittlement, and little stress whitening on buckling or creasing, and they are therefore suitable by way of example as windows in the following: tarpaulins, cabriolet covers, or sails. These foils can moreover be used for the protective covering of keyboards, in particular of notebooks or computer keyboards, in order to protect these from environmental effects, for example wet conditions. Foils of this type often have a thickness below 1 mm, for example from 0.05 to 0.5 mm.

It is moreover also possible to use the compositions of the invention to coat moldings. An important application sector is found in the formation of thin surface layers of thickness by way of example from 0.05 to 0.5 mm on stiff, dimensionally stable substrates, such as sheet metal, cardboard, particle board, plastics sheet, and similar moldings. In this case, the proportion of the tough phase can be substantially lower, and the molding composition can consequently be harder. Various processes are available for producing coatings of this type: the molding composition can be extruded to give a foil, which can be smoothed and can be laminated onto the substrate. The extrusion coating technique can be used to apply an extrudate to the surface of the substrate and to smooth the extrudate by means of a roll. If a thermoplastic is used as actual substrate, there is the possibility of coextruding the two compositions to form a surface layer made of the clear molding composition of the invention. The plastic can moreover be used in 3D-molding processes (membrane pressing; insert molding). It is also possible here to form complex geometric shapes at very low temperatures, without any inappropriate impairment of the properties of the plastic. One particular application sector is provided in particular by moldings used in winter sports: in particular, skis or snowboards can be coated with the plastics of the present invention, and foils can also be used for this purpose. It is also possible to coat placards of any type, in particular information placards, traffic signs, and motor-vehicle registration plates, with the plastics mixtures of the present invention; foils are also applied to said articles for this purpose. Another interesting application sector for the present invention is provided by coated transparent plastics sheets which can be used as a constituent of buildings, for example greenhouses.

The compositions of the invention are also suitable for producing moldings with a wall thickness above 1 mm; e.g. of extruded webs of thickness from 1 to 10 mm which can successfully be used in a stamping process and by way of example are suitable for producing printable panels for electrical equipment, or for producing high-quality injection moldings, e.g. glazing for motor vehicles.

Another embodiment of the present invention also provides the use of a composition of the invention comprising at least one thermoplastic polyurethane and at least one poly(meth)acrylate as described above, or of a composition obtainable by a process of the invention, for producing a foil.

One preferred embodiment of the present invention also provides the use of a composition of the invention comprising at least one thermoplastic polyurethane and at least one poly(meth)acrylate as described above, or of a composition obtainable by a process of the invention, for coating a molding.

For the purposes of the present invention, particular preference is given to the use of a composition of the invention comprising at least one thermoplastic polyurethane and at least one poly(meth)acrylate as described above, or of a composition obtainable by a process of the invention, for coating of wood, for example doors, tables, benches, facades, or timber boards, for coating external automobile parts, for floor coating, for example for laminate, for ski and water-ski coating, surfboard coating, and coating of furniture surfaces.

Other embodiments of the present invention can be found in the claims and in the examples. The abovementioned features of the article/process/uses of the invention, and the features explained below, can of course be used not only in the respective combination stated but also in other combinations, without exceeding the scope of the invention. By way of example, therefore, the invention also implicitly comprises the combination of a preferred feature with a particularly preferred feature, or to combine a feature not characterized in any further detail with a particularly preferred feature, etc., even if this combination is not expressly mentioned.

Examples of embodiments of the present invention are listed below, but do not restrict the present invention. In particular, the present invention also comprises embodiments that result from the dependencies stated below, and therefore from combinations.

1. A composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.
2. The composition according to embodiment 1, where the at least one diol is a polyester diol.
3. The composition according to embodiments 1 or 2, where the at least one thermoplastic polyurethane has a melt volume flow rate (MVR) in the range from 5 to 200 g/10 min, measured in accordance with DIN EN ISO 1133.

4. The composition according to any of embodiments 1 to 3, where the Shore hardness (Shore A) of the thermoplastic polyurethane is in the range from 70 to 100, determined in accordance with DIN 53505.
5. The composition according to any of embodiments 1 to 4, where the at least one chain extender is one selected from the group consisting of ethylene 1,2-glycol, 1,3-propanediol, 1,4-butanediol, and 1,6-hexanediol.
6. The composition according to any of embodiments 1 to 5, where the at least one poly(meth)acrylate is an impact-modified poly(meth)acrylate.
7. The composition according to any of embodiments 1 to 6, where the ratio by weight of the at least one thermoplastic polyurethane to the at least one poly(meth)acrylate is in the range from 1:5 to 1:1.
8. The composition according to any of embodiments 1 to 7, where an injection-molded plaque of thickness 2 mm produced from the composition has a HAZE value smaller than 25, measured in accordance with ASTM D1003, Procedure A, using test specimens measuring 2 mm.
9. A process for producing a composition according to any of embodiments 1 to 8, where the at least one thermoplastic polyurethane is compounded at a temperature in the range from 200 to 260° C. with the at least one poly(meth)acrylate.
10. A molding comprising a composition according to any of embodiments 1 to 8 or a composition obtainable by a process according to embodiment 9.
11. The molding according to embodiment 10, where the molding is a foil.
12. The use of a composition according to any of embodiments 1 to 8, or of a composition obtainable by a process according to embodiment 9, for producing a foil.
13. The use of a composition according to any of embodiments 1 to 8, or of a composition obtainable by a process according to embodiment 9, for coating a molding.
14. A composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, determined in accordance with DIN 53505.
15. A composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one poly(meth)acrylate is an impact-modified poly(meth)acrylate.
16. A composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one poly(meth)acrylate is an impact-modified poly(meth)acrylate, and where the ratio by weight of the at least one thermoplastic polyurethane to the at least one poly(meth)acrylate is in the range from 1:5 to 1:1.
17. A composition comprising at least one thermoplastic polyurethane and at least one poly(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, where the at least one poly(meth)acrylate is an impact-modified poly(meth)acrylate, and where the ratio by weight of the at least one thermoplastic polyurethane to the at least one poly(meth)acrylate is in the range from 1:5 to 1:1.
18. A composition comprising at least one thermoplastic polyurethane and at least one poly(meth)acrylate, where the at least one thermoplastic polyurethane is a polyurethane based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.
19. The composition according to embodiment 18, where the at least one thermoplastic polyurethane has a melt volume flow rate (MVR) in the range from 5 to 200 g/10 min, measured in accordance with DIN EN ISO 1133.
20. The composition according to embodiment 18 or 19, where the Shore hardness (Shore A) of the thermoplastic polyurethane is in the range from 70 to 100, in accordance with DIN 53505.
21. The composition according to any of embodiments 18 to 20, where the at least one chain extender is one selected from the group consisting of ethylene 1,2-glycol, 1,3-propanediol, 1,4-butanediol, and 1,6-hexanediol.
22. The composition according to any of embodiments 18 to 21, where the at least one poly(meth)acrylate is an impact-modified poly(meth)acrylate.
23. The composition according to any of embodiments 18 to 22, where the ratio by weight of the at least one thermoplastic polyurethane to the at least one poly(meth)acrylate is in the range from 1:5 to 1:1.
24. The composition according to any of embodiments 18 to 23, where an injection-molded plaque of thickness 2 mm produced from the composition has a HAZE value smaller than 25, measured in accordance with ASTM D1003, Procedure A, using test specimens measuring 2 mm.

25. A process for producing a composition according to any of embodiments 18 to 24, where the at least one thermoplastic polyurethane is compounded at a temperature in the range from 200 to 260° C. with the at least one poly(meth)acrylate.
26. A molding comprising a composition according to any of embodiments 18 to 24, or a composition obtainable by a process according to embodiment 25.
27. The molding according to embodiment 26, where the molding is a foil.
28. The foil comprising a composition according to any of embodiments 18 to 24, or a composition obtainable by a process according to embodiment 25.
29. The use of a composition according to any of embodiments 18 to 24, or of a composition obtainable by a process according to embodiment 25, for producing a foil.
30. The use of a composition according to any of embodiments 18 to 24, or of a composition obtainable by a process according to embodiment 25, for coating a molding.
31. A composition comprising at least one thermoplastic polyurethane and at least one poly(meth)acrylate, where the at least one thermoplastic polyurethane is a polyurethane based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, determined in accordance with DIN 53505.
32. A composition comprising at least one thermoplastic polyurethane and at least one poly(meth)acrylate, where the at least one thermoplastic polyurethane is a polyurethane based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one poly(meth)acrylate is an impact-modified poly(meth)acrylate.
33. A composition comprising at least one thermoplastic polyurethane and at least one poly(meth)acrylate, where the at least one thermoplastic polyurethane is a polyurethane based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one poly(meth)acrylate is an impact-modified poly(meth)acrylate, and where the ratio by weight of the at least one thermoplastic polyurethane to the at least one poly(meth)acrylate is in the range from 1:5 to 1:1.
34. A composition comprising at least one thermoplastic polyurethane and at least one poly(meth)acrylate, where the at least one thermoplastic polyurethane is a polyurethane based on hexamethylene 1,6-diisocyanate (HDI), on at least one polyester diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, where the at least one poly(meth)acrylate is an impact-modified poly(meth)acrylate, and where the ratio by weight of the at least one thermoplastic polyurethane to the at least one poly(meth)acrylate is in the range from 1:5 to 1:1.
35. A composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol.
36. The composition according to embodiment 35, where the at least one diol is a polyester diol.
37. The composition according to embodiment 35 or 36, where the at least one thermoplastic polyurethane has a melt volume flow rate (MVR) in the range from 5 to 200 g/10 min, measured in accordance with DIN EN ISO 1133.
38. The composition according to any of embodiments 35 to 37, where the Shore hardness (Shore A) of the thermoplastic polyurethane is in the range from 70 to 100, determined in accordance with DIN 53505.
39. The composition according to any of embodiments 35 to 38, where the at least one chain extender is one selected from the group consisting of ethylene 1,2-glycol, 1,3-propanediol, 1,4-butanediol, and 1,6-hexanediol.
40. The composition according to any of embodiments 35 to 39, where the at least one polymethyl(meth)acrylate is an impact-modified poly(meth)acrylate.
41. The composition according to any of embodiments 35 to 40, where the ratio by weight of the at least one thermoplastic polyurethane to the at least one polymethyl(meth)acrylate is in the range from 1:5 to 1:1.
42. The composition according to any of embodiments 35 to 41, where an injection-molded plaque of thickness 36 mm produced from the composition has a HAZE value smaller than 25, measured in accordance with ASTM D1003, Procedure A, using test specimens measuring 36 mm.
43. A process for producing a composition according to any of embodiments 35 to 42, where the at least one thermoplastic polyurethane is compounded at a temperature in the range from 200 to 260° C. with the at least one polymethyl(meth)acrylate.
44. A molding comprising a composition according to any of embodiments 35 to 42 or a composition obtainable by a process according to embodiment 43.
45. The molding according to embodiment 44, where the molding is a foil.
46. The use of a composition according to any of embodiments 35 to 42, or of a composition obtainable by a process according to embodiment 43, for producing a foil.

47. The use of a composition according to any of embodiments 35 to 42, or of a composition obtainable by a process according to embodiment 43, for coating a molding.

48. A composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, determined in accordance with DIN 53505.

48. A composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one polymethyl(meth)acrylate is an impact-modified polymethyl(meth)acrylate.

49. A composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the at least one polymethyl(meth)acrylate is an impact-modified polymethyl(meth)acrylate, and where the ratio by weight of the at least one thermoplastic polyurethane to the at least one polymethyl(meth)acrylate is in the range from 1:5 to 1:1.

50. A composition comprising at least one thermoplastic polyurethane and at least one polymethyl(meth)acrylate, where the at least one thermoplastic polyurethane is a polyurethane based on hexamethylene 1,6-diisocyanate (HDI), on at least one diol, and on at least one chain extender, selected from the group consisting of ethylene 1,2-glycol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane, and neopentyl glycol, where the Shore hardness (Shore A) of the thermoplastic polyurethane is in the range from 70 to 100, where the at least one polymethyl(meth)acrylate is an impact-modified polymethyl(meth)acrylate, and where the ratio by weight of the at least one thermoplastic polyurethane to the at least one polymethyl(meth)acrylate is in the range from 1:5 to 1:1.

The examples below serve to illustrate the invention, but have no restricting effect at all on the subject matter of the present invention.

EXAMPLES

1. Starting Material 1.1 The Following Standard poly(meth)acrylate Grades Were Used:

| | |
|---|---|
| PMMA LG EG 920 | Extrusion quality, MFR about 1.4 g/10 min (ASTM D1238 - 230° C., 3.8 kg) from LG, |
| PMMA LG EH 910 | Extrusion quality, MFR about 0.9 g/10 min (ASTM D1238 - 230° C., 3.8 kg) from LG, |
| PMMA IF 870S | Standard product, MFR about 20 g/10 min (ASTM D1238 - 230° C., 3.8 kg) from LG, |
| PMMA IG 840 | Standard product, MFR about 5 g/10 min (ASTM D1238 - 230° C., 3.8 kg) from LG |

Impact-modified grades:

| | |
|---|---|
| PMMA HI 835S | MFR about 2.6 g/10 min (ASTM D1238 - 230° C., 3.8 kg) from LG |
| Plexiglas zk 50 | MVR 0.1 cm$^3$/10 min (DIN EN ISO 1133 - 230° C., 3.8 kg) from Röhm |

1.2 The Following TPU Materials Were Also Used: Elastollan A to G.

Table 1 collates the formulations of the TPU used.

TABLE 1

Formulations of TPU used. Data in parts by weight.

| Elastollan | A | B | C | D | E | F | G |
|---|---|---|---|---|---|---|---|
| Polyol 1 | 1000 | | | | | | |
| Polyol 2 | | 1000 | | | | | |
| Polyol 3 | | | | | | | 1000 |
| Polyol 4 | | | 1000 | 1000 | | 1000 | |
| Polyol 5 | | | | | 1000 | | |
| Hexamethylene 1,6-diisocyanate | 247 | 273 | 319 | | | | |
| 4,4'-Diisocyanato-dicyclohexylmethane | | | | 1203 | 1213 | | |
| Diphenylmethane 4,4'-diisocyanate | | | | | | 1665 | 1630 |
| 1,6-Hexanediol | | 111 | 106 | | | | |
| 1,4-Butanediol | 93 | | | 323 | 324 | 504 | 540 |
| Elastostab H01 | 14 | 8 | | | 31 | | 8 |

Table 2 shows the constitutions of the polyols used. The acid number of each of the polyols here is <0.8 mg KOH/g, and the water content in the polyol is in each case <0.03%, and the functionality of the polyol is in each case 2.

Polyol 5 is marketed with trademark Capa™2100 by Perstorp. Polyol 4 is marketed with trademark PolyTHF® 1000 by BASF.

TABLE 2

Constitution of polyols used

| | OH number [mg KOH/g] | Monomers |
|---|---|---|
| Polyol 1 | 45 | Adipic acid - butanediol-1,4 |
| Polyol 2 | 56 | adipic acid - 1,4-butanediol - 1,6-hexanediol 1,6-hexanediol:1,4-butanediol ratio as 1:1 |
| Polyol 3 | 56 | adipic acid - 1,4-butanediol - ethylene 1,2-glycol ratio of ethylene 1,2-glycol to 1,4-butanediol as 1:1 |
| Polyol 4 | 112 | tetrahydrofuran |
| Polyol 5 | 112 | caprolactone monomer |

2. Production Examples

2.1 Production of TPU Materials by the Manual Casting Process

The amount defined in the main formulation of polyol and of the chain extenders is weighed in the tinplate container and briefly blanketed with nitrogen. The container is closed with a lid and heated to about 90° C. in the oven.

Another oven is preheated to 80° C. for conditioning the skin. The Teflon dish is placed on the hotplate, which is adjusted to 125° C.

The calculated amount of liquid isocyanate is determined as follows: the liquid isocyanate (at a temperature of about 48° C. in the case of MDI) is weighed in a PE beaker and within 10 s poured out into another PE beaker. The beaker thus emptied is then tared and charged with the calculated amount of isocyanate. In the case of MDI, this material is stored at about 48° C. in the oven.

Additions such as hydrolysis stabilizer, antioxidant, etc. that are solids at room temperature are weighed directly into the system.

The preheated polyol is placed on an elevating platform under the stirrer, which is at rest. The reaction vessel is then raised by the elevating platform until the stirrer blades are completely immersed in the polyol.

Before the stirrer motor is switched on, it is vital to ensure that the rotation rate regulator is in the zero position. The rotation rate is then slowly raised in such a way as to ensure good mixing without air inclusion.

Additives, such as antioxidants, are then added to the polyol.

The temperature of the reaction mixture is carefully adjusted to 80° C. by using a hot-air blower.

If necessary, before isocyanate addition, catalyst is metered into the reaction mixture by using a microliter syringe. Isocyanate is then added at 80° C., by introducing the amount obtained as described above into the reaction mixture within 10 s. The weight is monitored by backweighing. Deviations of +/−0.2 g from the amount in the formulation are recorded. The stopclock is started when the isocyanate is added. When 110° C. is reached, the reaction mixture is poured out into the Teflon dishes, which have been preheated to 125° C.

10 min after the stopclock was started, the skin is taken from the hotplate and then stored at 80° C. in the oven for 15 h. The cooled skin is comminuted in a chopper mill. The granulated material is then dried at 110° C. for 3 h, and stored under dry conditions.

In principle, this method can also be used in a reactive extruder or in the belt process.

Table 3 collates Shore hardness and volume flow index as measure of the molecular weight of the resultant Elastollan products A to G

TABLE 3

| Properties of the TPU used | | | |
|---|---|---|---|
| Elastollan | Shore A hardness | Shore D hardness | MVR value [cm$^3$/10 min] (200° C./5 kg) |
| A | 90 | | 15 |
| B | 85 | | 40 |
| C | 85 | | 150 |
| D | | 60 | 30 |
| E | | 65 | 20 |
| F | | 74 | 0 |
| G | | 74 | 0 |

2.2 Production of TPU-PMMA Blends

Each TPU-PMMA blend was produced by using a Berstorff ZE 40 A twin-screw extruder with screw length 35 D, divided into 10 barrel sections, and then injection-molded in an Arburg 520S with screw diameter 30 mm. The thickness of the injection-molded plaques was 2 mm.

3. Testing of Blends

Total transmittance, HAZE value, and clarity values were determined in accordance with ASTM D1003 (Procedure A). All of the values (total transmittance, HAZE, and clarity) were determined by using haze gard plus—equipment produced by: BYK Gardner.

Table 4 collates the constitution of the resultant blends 1 to 7, and also each value determined for transmittance, HAZE, and clarity. Blends 1 to 3 are of the invention, but blends 4 to 7 are comparative examples (CE).

TABLE 4

| Blend | | 1 | 2 | 3 | 4 (CE) | 5 (CE) | 6 (CE) | 7 (CE) |
|---|---|---|---|---|---|---|---|---|
| Elastollan A | [pts. by wt.] | 25 | | | | | | |
| Elastollan B | [pts. by wt.] | | 25 | | | | | |
| Elastollan C | [pts. by wt.] | | | 25 | | | | |
| Elastollan D | [pts. by wt.] | | | | 25 | | | |
| Elastollan E | [pts. by wt.] | | | | | 25 | | |
| Elastollan F | [pts. by wt.] | | | | | | 25 | |
| Elastollan G | [pts. by wt.] | | | | | | | 25 |
| PMMA HI 835 HS | [pts. by wt.] | 75 | 75 | 75 | 75 | 75 | 75 | 75 |
| Transmittance | | 91.5 | 89.5 | 87.2 | 74.9 | 70.7 | 26.5 | 35.2 |
| Haze | | 18.6 | 16.2 | 53.1 | 79.4 | 60.2 | 102.0 | 101.7 |
| Clarity | | 85.4 | 91.4 | 66.4 | 69.3 | 93.6 | 1.3 | 3.3 |

Table 5 collates the constitution of the resultant blends 1 to 7, and also each value determined for transmittance, HAZE, and clarity. Blends 8 to 10 are of the invention, but blend 11 is a comparative example (CE).

TABLE 5

| Blend | | 8 | 9 | 10 | 11 (CE) |
|---|---|---|---|---|---|
| Elastollan A | [pts. by wt.] | 25 | | | |
| Elastollan B | [pts. by wt.] | | 25 | | |
| Elastollan C | [pts. by wt.] | | | 25 | |
| Elastollan D | [pts. by wt.] | | | | 25 |
| Plexiglas ZK 50 | [pts. by wt.] | 75 | 75 | 75 | 75 |
| Transmittance | | 90.5 | 89.4 | 88.4 | 73.1 |
| Haze | | 16.5 | 14.2 | 52.7 | 99.5 |
| Clarity | | 87.1 | 87.9 | 76.0 | 15.7 |

Table 6 collates the constitution of resultant blends 12 to 14, and also each value determined for transmission, HAZE, and clarity. Blends 12 to 14 are of the invention.

TABLE 6

| Blend | | 12 | 13 | 14 |
|---|---|---|---|---|
| Elastollan B | [pts. by wt.] | 15 | 25 | 35 |
| PMMA HI 835 HS | [pts. by wt.] | 85 | 75 | 65 |
| Transmittance | | 90.9 | 88.8 | 88.5 |
| HAZE | | 14.2 | 20.0 | 28.5 |
| Clarity | | 94.7 | 91.6 | 89.7 |

Table 7 collates the constitution of resultant blends 15 to 18, and also each value determined for transmittance, HAZE, and clarity. Blends 15 to 18 are of the invention.

TABLE 7

| Blend | | 15 | 16 | 17 | 18 |
|---|---|---|---|---|---|
| Elastollan B | [pts. by wt.] | 25 | 25 | 25 | 25 |
| PMMA LG EG 920 | [pts. by wt.] | 75 | | | |
| PMMA LG EFH 910 | [pts. by wt.] | | 75 | | |
| PMMA LG IF 870S | [pts. by wt.] | | | 75 | |
| PMMA LG IG 840 | [pts. by wt.] | | | | 75 |
| Transmittance | | 90.3 | 89.9 | 89.9 | 90.2 |
| HAZE | | 13.5 | 13.5 | 11.4 | 13.8 |
| Clarity | | 94.5 | 93.3 | 92.5 | 95.4 |

The invention claimed is:

1. A composition, comprising:
   a polymer mixture consisting of:
      from 5% to 60% by weight of at least one thermoplastic polyurethane, and
      from 40 to 95% by weight of at least one poly(meth)acrylate,
      wherein
      the amount by weight in each case is based on the total weight of the composition,
      the at least one poly(meth)acrylate optionally comprises an impact-modified poly(meth)acrylate,
      the at least one thermoplastic polyurethane is a polyurethane obtained by reaction of a reaction mixture consisting of components (i), (ii), (iii) and (iv):
         (i) an organic isocyanate consisting of hexamethylene 1,6-diisocyanate (HDI),
         (ii) at least one diol selected from the group consisting of a polyester diol and a polyether diol, and
         (iii) at least one chain extender selected from the group consisting of ethylene 1,2-glycol, 1,3-propanediol, 1,4-butanediol, and 1,6-hexanediol; and
         (iv) optionally, a catalyst and/or a conventional auxiliary selected from a surfactant substance, a inorganic filler, an organic filler, a further flame retardant, a nucleating agent, an oxidation stabilizer, a lubricant, a mold-release aid, a dye, a pigment, a stabilizer for protection from hydrolysis, light, heat, or discoloration, a reinforcing agent, and a plasticizer;
   wherein the at least one thermoplastic polyurethane has a melt volume flow rate (MVR) ranging from 5 to 200 g/10 min, measured in accordance with DIN EN ISO 1133,
   wherein the melt volume flow rate is measured at a specimen temperature of 200° C. and with 5 kg load; and
   wherein said composition is suitable for producing a foil and/or for coating a molding;
   wherein an injection-molded plaque of thickness 2 mm produced from the composition has a HAZE value smaller than 25, measured in accordance with ASTM D1003, Procedure A, using test specimens measuring 2 mm.

2. The composition according to claim 1, wherein the at least one diol is a polyester diol.

3. The composition according to claim 1, wherein the at least one thermoplastic polyurethane has a Shore hardness (Shore A) ranging from 70 to 100, determined in accordance with DIN 53505.

4. The composition according to claim 1, wherein the at least one poly(meth)acrylate is an impact-modified poly(meth)acrylate.

5. The composition according to claim 1, wherein a ratio by weight of the at least one thermoplastic polyurethane to the at least one poly(meth)acrylate ranges from 1:5 to 1:1.

6. A process for producing the composition according to claim 1, the process comprising:
   compounding the at least one thermoplastic polyurethane at a temperature ranging from 200 to 260° C. with the at least one poly(meth)acrylate.

7. A molding, comprising the composition according to claim 1.

8. The molding according to claim 7, wherein the molding is a foil.

9. A method for producing a foil, the method comprising: employing the composition according to claim 1 to obtain the foil.

10. A method for coating a molding, the method comprising: coating the molding with the composition according to claim 1.

11. The composition according to claim 2, wherein the at least one poly(meth)acrylate is an impact-modified poly(meth)acrylate.

12. The composition according to claim 2, wherein a ratio by weight of the at least one thermoplastic polyurethane to the at least one poly(meth)acrylate ranges from 1:5 to 1:1.

13. The composition according to claim 4, wherein a ratio by weight of the at least one thermoplastic polyurethane to the at least one poly(meth)acrylate ranges from 1:5 to 1:1.

14. A molding, comprising: a composition obtained by the process according to claim 6.

15. A method for producing a foil, the method comprising: employing a composition obtained by the process according to claim 6 to obtain the foil.

16. A method for coating a molding, the method comprising: coating the molding with a composition obtained by the process according to claim 6.

17. The composition according to claim 11, wherein a ratio by weight of the at least one thermoplastic polyurethane to the at least one poly(meth)acrylate ranges from 1:5 to 1:1.

* * * * *